United States Patent
Cuddihy et al.

[11] Patent Number: 6,099,032
[45] Date of Patent: Aug. 8, 2000

[54] SEAT WEIGHT SENSOR SYSTEM FOR CONTROLLING A VEHICLE RESTRAINING DEVICE

[75] Inventors: Mark Anthony Cuddihy, New Boston; Matt Alan Niesluchowski, Troy; Curtis David Kalina, Northville, all of Mich.

[73] Assignee: Ford Global Technologies, Inc., Dearborn, Mich.

[21] Appl. No.: 09/127,947

[22] Filed: Aug. 3, 1998

[51] Int. Cl.⁷ .......................... B60R 21/32; B60R 21/00
[52] U.S. Cl. ............................ 280/735; 180/268
[58] Field of Search .................. 280/735, 807; 180/273, 268, 271

[56] References Cited

U.S. PATENT DOCUMENTS

| | | |
|---|---|---|
| 5,398,185 | 3/1995 | Omura . |
| 5,411,289 | 5/1995 | Smith et al. . |
| 5,413,378 | 5/1995 | Steffens, Jr. et al. . |
| 5,454,591 | 10/1995 | Mazur et al. . |
| 5,468,014 | 11/1995 | Gimbel et al. ................... 280/735 |
| 5,474,327 | 12/1995 | Schousek . |
| 5,570,903 | 11/1996 | Meister et al. . |
| 5,573,269 | 11/1996 | Gentry et al. . |
| 5,626,359 | 5/1997 | Steffens, Jr. et al. . |
| 5,636,864 | 6/1997 | Hori .................................. 280/735 |
| 5,732,375 | 3/1998 | Cashler . |
| 5,831,342 | 11/1998 | Vivacqua et al. . |

*Primary Examiner*—Paul N. Dickson
*Assistant Examiner*—Faye M. Fleming
*Attorney, Agent, or Firm*—David B. Kelley

[57] ABSTRACT

A sensing system and method for automatically deactivating an airbag (46) in a vehicle (10). The sensing system includes a seat weight sensor (52) mounted, for example, in a front passenger seat (16), and an ALR sensor (34) for detecting if an automatic locking retractor (32) is active. Signals from these sensors are received by a seat weight sensor module (50). If the automatic locking retractor (32) is active, then a predetermined weight is subtracted from the weight reading detected by the seat weight sensor (52) to produce a weight value prior to comparing the weight value to a predetermined threshold value. If the threshold value is larger, then the sensor module (50) signals the airbag module (48) to deactivate the airbag (46).

20 Claims, 2 Drawing Sheets

SEAT WEIGHT SENSOR SYSTEM FOR CONTROLLING A VEHICLE RESTRAINING DEVICE

FIELD OF THE INVENTION

The present invention relates to a passenger restraint system employed in a vehicle, and more particularly to a sensing system and method for preventing deployment of a portion of the restraint system under certain circumstances.

BACKGROUND OF THE INVENTION

A typical vehicle today includes at least front airbags to protect front seat passengers in the event of a collision. The driver sits behind an airbag mounted in the steering wheel and the front seat passenger sits behind an airbag mounted in the instrument panel. In certain situations, however, it may be desirable to deactivate the passenger side airbag. One such situation is where a child will be sitting in a child seat mounted on the front passenger seat, or where a small child is sitting directly on the front passenger seat. Some vehicles have incorporated manual airbag deactivation switches to allow for such situations. But there may be vehicles where it is preferable to incorporate an automated airbag deactivation system in situations such as these.

In order for such a deactivation system to work automatically, there must be some type of sensor arrangement in order for the vehicle electronics to determine that a rear or forward facing child seat or a small child is in the front passenger seat and deactivate that airbag. Some have attempted to accomplish this using a sophisticated array of sensors, but this is very expensive and complex. Others have tried to sense the weight of the occupant on the front passenger seat and from this decide whether to deactivate the airbag; however, these systems may not operate as desired for all situations, and so additional expensive sensors are added to enhance the system. Thus, the desire for a reliable automated deactivation system is generally more expensive than is desirable. Consequently, a reliable and inexpensive system is desired for automatically deactivating a front seat passenger side airbag when a child seat or a small child occupies that seat.

SUMMARY OF THE INVENTION

In its embodiments, the present invention contemplates a seat weight sensor system for controlling the deactivation of an airbag assembly in a vehicle having a seat located in proximity to the airbag, and a seat belt assembly operatively engaging the seat. The seat weight sensor system includes an automatic locking retractor, having an active and a non-active state, adapted to operatively engage a portion of the seat belt assembly, and an ALR detection switch for detecting which state the automatic locking retractor is in. A seat weight sensor is adapted for detecting the weight pressing down on the seat. The seat weight sensor system also includes correction means for adjusting the weight detected by the seat weight sensor based upon the state detected by the ALR detector switch to produce a weight value.

The present invention further contemplates a method for determining airbag deactivation in a vehicle including a seat, an airbag assembly in front of the seat, and a seat belt operatively engaging the seat including an automatic locking retractor having an active and a non-active state. The method includes the steps of: sensing the weight on the front passenger seat; sensing the activation state of the automatic locking retractor; and adjusting the sensed weight to produce a weight value based upon the sensed activation state.

Accordingly, an object of the present invention is to provide an airbag deactivation system employing a reading from a seat weight sensor adjusted based upon the state of the automatic locking retractor.

Another object of the present invention is to provide a method for determining what adjustments to the seat weight reading need to be made and determining an airbag active/deactivate signal based thereon.

An advantage of the present invention is that the seat weight sensor can take into account situations where the weight readings from the sensor are higher than the actual weight of the occupant and/or child seat and adjust the readings in order to properly determine whether airbag deactivation will occur. In one such situation, the seat weight sensor system will account for child seats that are installed with an automatic locking retractor activated and the seat belt tightly cinched, while still deactivating the passenger side airbag when needed. Also, should an adult occupant activate the ALR the adult would still be recognized as such given the correction factor employed when the ALR is activated.

A further advantage of the present invention is that the system employs simple, inexpensive sensors to accomplish the automatic airbag deactivation.

DETAILED DESCRIPTION OF THE PREFERRED EMBODIMENTS

Figure 1:
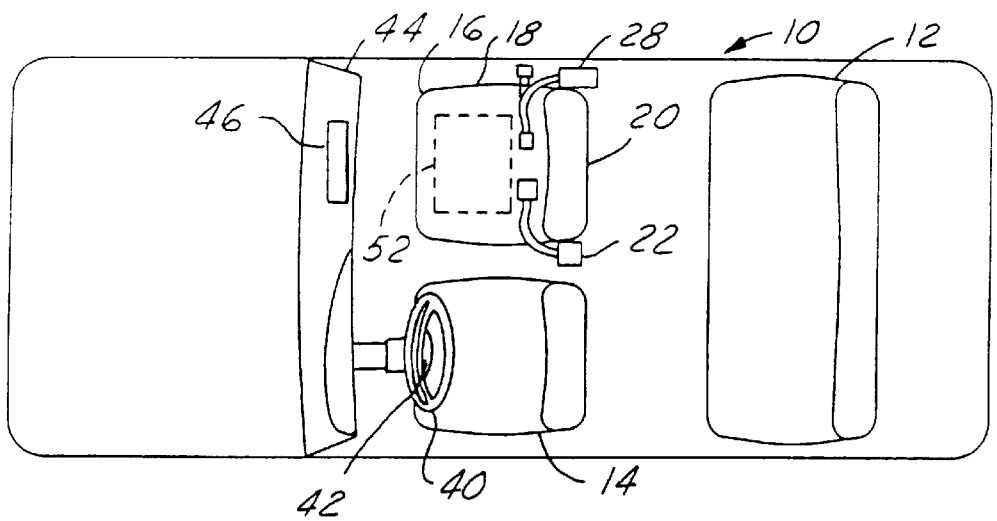
FIG. 1 is a schematic view looking down into a vehicle illustrating the seating and sensor assembly in accordance with the present invention.
Figure 2:
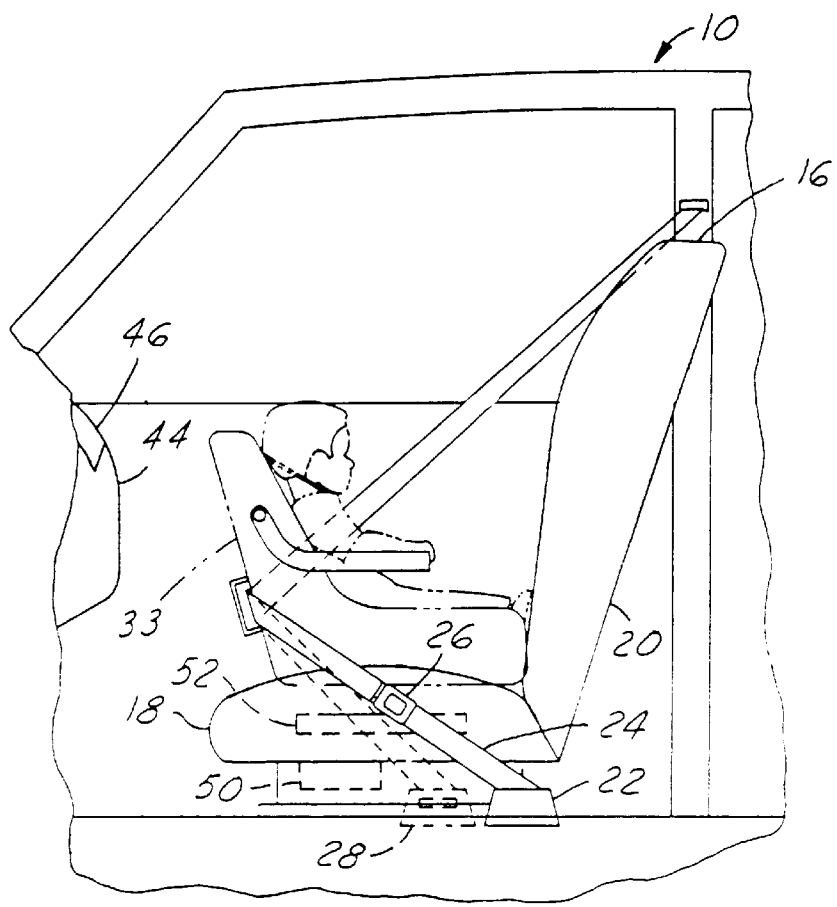
FIG. 2 is a schematic side view illustrating a vehicle front passenger seat and sensor assembly with a child seat mounted on the seat.
Figure 3:
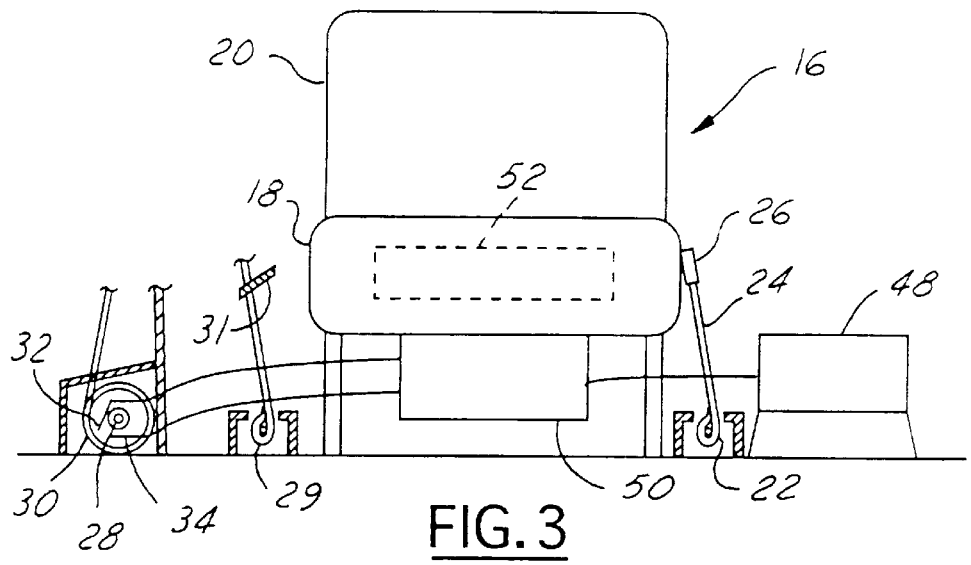
FIG. 3 is a schematic rearward looking view of the front passenger seat and sensor assembly.

FIGS. 1–3 illustrate a typical vehicle 10 having a back seat 12, a front driver seat 14 and a front passenger seat 16. The front driver 14 and passenger 16 seats, although shown as separate herein can also be formed as a single bench seat. The passenger seat 16 includes a seat portion 18, and a back portion 20 extending up from the seat portion 18.

Mounted on the inboard side of the passenger seat 16 is a first seat belt mount 22, having a fixed length of belt 24 extending therefrom with a buckle 26 at the other end. Mounted on the outboard side of the passenger seat 16 is a second 28 and a third 29 seat belt mount 28, with the second mount 28 including a spring loaded coil of belt 30. A clasp 31 is slidably mounted between the two mounts 28 and 29. This second mount 28 can be on the floor and/or on the B-pillar of the vehicle, depending upon the particular vehicle configuration. As an alternative, one or more of the three seat belt mounts may be affixed directly to the seat 16 if so desired.

The second mount 28 also includes an automatic locking retractor (ALR) mechanism 32. An ALR sensor 34 is mounted adjacent the ALR 32 and can detect when the ALR 32 is active. The ALR 32 prevents the belt 30 from being uncoiled under certain conditions. For example, as is shown in FIG. 2 in phantom, a rear facing child seat 33 can be firmly restrained within the seat by connecting the two portions of the seat belt 24 and 30 while the ALR 32 is active. In this case, a typical ALR 32 will be activated during installation of the child seat 33 by uncoiling the belt 30 fully and then threading the belt through the appropriate location on the child seat 33.

This mounting procedure is also employed for typical forward facing child seats, not shown. The vehicle 10 also includes front airbag assemblies. Mounted within a steering wheel 40 is a drivers side, front airbag assembly 42, and mounted within an instrument panel 44 is a passenger side, front airbag 46 assembly. The two front airbag assemblies 42 and 46 are electrically connected to an electronic airbag module 48, which controls the deployment system in typical fashion known to those skilled in the art and so not discussed further herein. Also electronically connected to the airbag module 48 is a seat weight sensor module 50. The seat weight sensor module 50 can be housed separately, as shown, or it can be formed as part of airbag module 48. Both of these modules 48 and 50 can be software or hardware based, or a combination of the two.

A seat weight sensor 52 is mounted within the seat portion 18 of the passenger seat 16 and is electrically connected to the sensor module 50. The ALR sensor 34 is also electrically connected to the sensor module 50. In this way, the seat weight measurement and ALR activation are processed in the seat weight sensor module 50. The airbag active/deactivate decision is then sent from the sensor module 50 to the airbag module 48.

Figure 4:
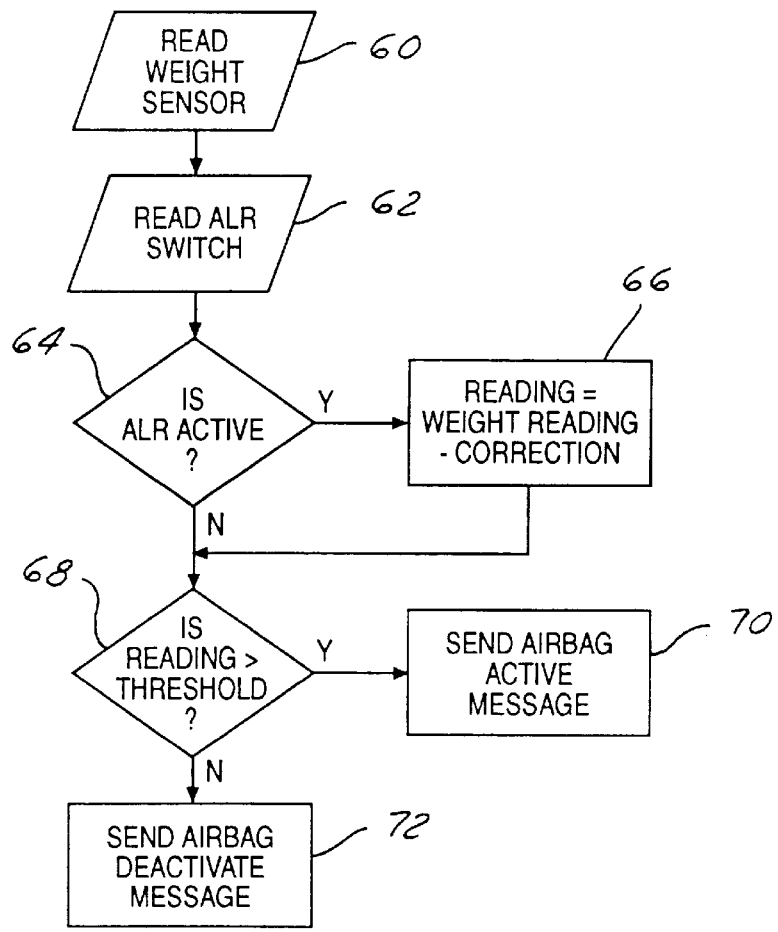
FIG. 4 is a flow chart illustrating a portion of the process for operating the sensor assembly in accordance with the present invention.

The algorithm for deciding the passenger airbag deactivation is illustrated in FIG. 4, and will be discussed as it relates to FIGS. 1–3. The process begins by the sensor module 50 obtaining a reading from the seat weight sensor 52, step 60, and also obtaining a reading from the ALR sensor 34 determining if the ALR is activated, step 62. Both of these steps can contain signal conditioning within the sensor module 50 as part of taking the readings, but since signal conditioning is well known to those skilled in the art, it will not be discussed further herein. A determination is then made whether the ALR 32 is active, step 64. If it is active, then a weight correction factor will be subtracted from the seat weight sensor reading, step 66, to obtain a seat weight value. If not, then the seat weight sensor reading will not be adjusted, it will be the seat weight value. For example, the weight correction factor may be on the order of fifty to seventy pounds, depending upon different factors for a particular vehicle, and this amount is then subtracted from the seat weight reading.

The weight value is then compared to a weight threshold, step 68. For example, this threshold may be in the range of forty to sixty pounds. If the weight value is greater than the weight threshold, then an airbag active message is sent to the airbag module 48, step 70, and the passenger side airbag 46 remains active. If the weight value is not greater than the weight threshold, then an airbag deactivate message is sent to the airbag module 48, step 72, and the passenger side airbag 46 is deactivated.

Thus, this algorithm for deactivating the passenger side airbag 46 uses the input from the retractor sensor 34 to indicate whether the automatic locking retractor 32 has been activated, and then subtracts a fixed weight correction in order to account for the possibility that a child seat is installed with the seat belt tightly cinched down. This will avoid an otherwise erroneous weight reading on the seat 16 due to the force applied by the seat belt, while still remaining active when an adult is sitting in the seat.

One alternative to this algorithm discussed above is to modify steps 64 and 66 so that there is also an upper weight limit, say for example 150 pounds, where no ALR activation determination or weight correction will be done. The reason for this is that above this weight limit, the occupant will surely be an adult and no airbag deactivation will be needed.

While this disclosure illustrates airbag deactivation specifically for a front passenger seat, it is also applicable to other seating locations where an airbag may be mounted and automatic deactivation is desirable. Thus, while certain embodiments of the present invention have been described in detail, those familiar with the art to which this invention relates will recognize various alternative designs and embodiments for practicing the invention as defined by the following claims.

We claim:

1. A seat weight sensor system for controlling the deactivation of an airbag assembly in a vehicle having a seat located in proximity to the airbag and a seat belt assembly operatively engaging the seat, the seat weight sensor system comprising:

an automatic locking retractor, having an active and a non-active state, adapted to operatively engage a portion of the seat belt assembly;

an automatic locking retractor detection switch for detecting which state the automatic locking retractor is in;

a seat weight sensor adapted for detecting the weight pressing down on the seat; and correction means for adjusting the weight detected by the seat weight sensor based upon the state detected by the automatic locking retractor detector switch to produce a weight value.

2. The seat weight sensor system of claim 1 further including comparing means for comparing the weight value to a predetermined threshold, and signal means for creating a deactivation signal if the weight value is not greater than the predetermined threshold.

3. The seat weight sensor system of claim 2 further including means adapted for receiving the deactivation signal and deactivating the airbag.

4. The seat weight sensor system of claim 2 wherein the predetermined threshold is in the range of about 40 to 60 pounds.

5. The seat weight sensor system of claim 2 wherein the correction means comprises adjustment means for subtracting a predetermined correction weight from the detected weight to produce the weight value when the automatic locking retractor detection switch detects that the automatic locking retractor is in an active state.

6. The seat weight sensor system of claim 5 wherein the predetermined correction weight is in the range of about 50 to 70 pounds.

7. The seat weight sensor system of claim 1 wherein the automatic locking retractor, the automatic locking retractor detection switch and the seat weight sensor are adapted to operatively engage the front passenger seat of the vehicle.

8. The seat weight sensor system of claim 1 wherein the correction means comprises adjustment means for subtracting a predetermined correction weight from the detected weight to produce the weight value when the automatic locking retractor detection switch detects that the automatic locking retractor is in an active state.

9. The seat weight sensor of claim 8 further including comparing means for comparing the weight value to a predetermined threshold, signal means for creating a deactivation signal if the weight value is not greater than the predetermined threshold, and means adapted for receiving the deactivation signal and deactivating the airbag.

10. A seat and restraint assembly for use in a vehicle comprising:
   a seat assembly mounted to the vehicle, the seat assembly having an inboard side and an outboard side;
   a seat belt assembly including a first seat belt portion attached to one of the vehicle and the seat on the inboard side of the seat assembly, and including a second seat belt portion attached to one of the vehicle and the seat and including a retractable coil of webbing;
   an automatic locking retractor operatively engaging the retractable coil of webbing and having an active and a non-active state;
   an automatic locking retractor detection switch for detecting which state the automatic locking retractor is in;
   a seat weight sensor for detecting the weight pressing down on the seat; and
   correction means for adjusting the weight detected by the seat weight sensor based upon the state detected by the automatic locking retractor detector switch to produce a weight value.

11. The seat and restraint assembly of claim 10 wherein the correction means comprises adjustment means for subtracting a predetermined correction weight from the detected weight to produce the weight value when the automatic locking retractor detection switch detects that the automatic locking retractor is in an active state.

12. The seat and restraint assembly of claim 11 further including comparing means for comparing the weight value to a predetermined threshold, and signal means for creating a deactivation signal if the weight value is not greater than the predetermined threshold.

13. The seat and restraint assembly of claim 12 further including means for receiving the deactivation signal and deactivating the airbag.

14. The seat and restraint assembly of claim 10 wherein the seat assembly is a front passenger seat assembly.

15. A method for determining airbag deactivation in a vehicle including a seat, an airbag assembly in front of the seat, and a seat belt operatively engaging the seat including an automatic locking retractor having an active and a non-active state, the method comprising the steps of:
   sensing the weight on the front passenger seat;
   sensing the activation state of the automatic locking retractor; and
   adjusting the sensed weight to produce a weight value based upon the sensed activation state.

16. The method of claim 15 wherein the step of adjusting the sensed weight includes subtracting a predetermined correction weight from the sensed weight to produce the weight value if the automatic locking retractor status is active.

17. The method of claim 16 further including the steps of:
   comparing the weight value to a predetermined threshold weight;
   generating an airbag activation signal if the weight value is greater than the threshold weight; and
   generating an airbag deactivation signal if the weight value is not greater than the threshold weight.

18. The method of claim 17 further including the step of deactivating the airbag when the airbag deactivation signal is generated.

19. The method of claim 18 wherein the predetermined Threshold weight is in the range of 40 to 60 pounds and the predetermined correction weight is in the range of 50 to 70 pounds.

20. The method of claim 15 further including the steps of:
   comparing the weight value to a predetermined threshold weight;
   generating an airbag activation signal if the weight value is greater than the threshold weight; and
   generating an airbag deactivation signal if the weight value is not greater than the threshold weight.

* * * * *